(12) United States Patent
Kim et al.

(10) Patent No.: US 9,826,221 B2
(45) Date of Patent: Nov. 21, 2017

(54) SYSTEM AND METHOD FOR MEASURING VIEWING ZONE CHARACTERISTICS OF AUTOSTEREOSCOPIC 3D IMAGE DISPLAY

(71) Applicant: KOREA INSTITUTE OF SCIENCE AND TECHNOLOGY, Seoul (KR)

(72) Inventors: Sung Kyu Kim, Seoul (KR); Ki Hyuk Yoon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 157 days.

(21) Appl. No.: 14/703,993

(22) Filed: May 5, 2015

(65) Prior Publication Data
US 2016/0165217 A1 Jun. 9, 2016

(30) Foreign Application Priority Data
Dec. 9, 2014 (KR) .................. 10-2014-0176200

(51) Int. Cl.
*H04N 13/04* (2006.01)
(52) U.S. Cl.
CPC ..... *H04N 13/0402* (2013.01); *H04N 13/0425* (2013.01)
(58) Field of Classification Search
CPC .................................................. H04N 13/0425
USPC ............................................................ 348/51
See application file for complete search history.

(56) References Cited

U.S. PATENT DOCUMENTS

| 6,337,721 B1* | 1/2002 | Hamagishi | G02B 27/2214 348/E13.029 |
| 2006/0227427 A1* | 10/2006 | Dolgoff | G02B 3/005 359/619 |
| 2008/0136900 A1* | 6/2008 | Grasnick | H04N 13/0404 348/51 |

(Continued)

OTHER PUBLICATIONS

Ki-Hyuk Yoon, et al., "Determination of the optimum viewing distance for a multi-view auto-stereoscopic 3D display", Optics Express, vol. 22, No. 19, published Sep. 11, 2014; 16 pages.

(Continued)

*Primary Examiner* — Helen Shibru
(74) *Attorney, Agent, or Firm* — Ladas & Parry LLP; Loren K. Thompson

(57) ABSTRACT

Disclosed are a system and method for measuring viewing zone characteristics of an autostereoscopic three-dimensional (3D) image display device. The system for measuring viewing zone characteristics of the autostereoscopic 3D image display device includes at least one image sensor that is provided on a front side of the image display device, and measures characteristics of luminance distribution of viewpoint images in a depth direction (Z-direction) formed from at least two local areas which are designated in advance in a horizontal direction (X-direction) of the image display device, and a determination unit that determines, as an optimum viewing distance (OVD), a position of the image sensor corresponding to a depth direction (Z-direction) having a horizontal direction (X-direction) minimum deviation of a center position of luminance distribution of light generated from the same viewpoint image of each of the at least two local areas by analyzing the characteristics of luminance distribution on an X-Z plane measured from the image sensor.

10 Claims, 11 Drawing Sheets

(56) References Cited

U.S. PATENT DOCUMENTS

| | | | |
|---|---|---|---|
| 2011/0051240 A1* | 3/2011 | Lin | G02B 27/0018 359/464 |
| 2012/0154808 A1* | 6/2012 | Lin | H04N 13/0425 356/400 |
| 2013/0027909 A1* | 1/2013 | Kim | G02F 1/133603 362/97.2 |
| 2013/0050445 A1* | 2/2013 | Miyake | G02B 27/225 348/51 |
| 2013/0088486 A1* | 4/2013 | Yoon | G02B 27/2214 345/419 |
| 2013/0181895 A1* | 7/2013 | Kim | H04N 13/0418 345/156 |
| 2013/0194252 A1* | 8/2013 | Kim | G06T 15/00 345/419 |
| 2014/0232837 A1* | 8/2014 | Kim | H04N 13/0409 348/59 |
| 2014/0320614 A1* | 10/2014 | Gaudreau | G02B 27/2214 348/51 |
| 2015/0029317 A1* | 1/2015 | Kim | G02B 27/2214 348/59 |
| 2015/0036211 A1* | 2/2015 | Chen | G02B 27/2214 359/462 |
| 2016/0021367 A1* | 1/2016 | Yoon | H04N 13/0497 348/59 |
| 2016/0360188 A1* | 12/2016 | Kim | H04N 13/0404 |

OTHER PUBLICATIONS

Korean Office Action Notice of Rejection, dated Oct. 8, 2015; Appln. No. 10-2014-0176200.

Atanas Boev, et al; "Crosstalk Measurement Methodology for Auto-Stereoscopic Screens", Published in: 3DTV Conference, May 7-9, 2007; pp. 1-4.

Toni Järvenpää, et al; "S7-3. Optical Characterization Methods for Autostereoscopic 3D Displays", Proc. of EuroDisplay 2007, S7-3, pp. 132-135.

Jooyoung Lee, et al; "23.2: Optical Performance Analysis Method of Auto-stereoscopic 3D Displays", SID Symposium Digest of Technical Papers, vol. 41, Issue 1, pp. 327-330, May 2010; Article first published online Jul. 5, 2012.

Marja Salmimaa, et al; "20.4: Objective Evaluation of Multi-View Autostereoscopic 3D Displays", SID Symposium of Technical Papers, vol. 39, Issue 1, pp. 267-270; May 2008; Article first published online Jul. 5, 2012.

Chou-Lin Wu, et al; "Autostereoscopic display optical properties evaluation", Published in Proc. SPIE 7524, Stereoscopic Displays and Applications XXI, 7524IL (Feb. 17, 2010; 7 pages.

Ki-Hyuk Yoon, et al; "Novel measurement method of multi-view 3D display for determining an optimum viewing distance (OVD)", Proc. SPIE 9117, Three-Dimension Imaging. Visualization, and Display 2014, 91170J (Jun. 5, 2014); 7 pages.

* cited by examiner

Relation Equations $$W_{PB\_S} = \frac{D_{VP} * W_P}{D_{VP} + W_P} \quad (1)$$

$$T_{PB} = \frac{n * D_{VP} * W_P}{D_{VP} + W_P} \quad (2), \quad d = \frac{OVD * W_P}{D_{VP}} \quad (3)$$

SYSTEM AND METHOD FOR MEASURING VIEWING ZONE CHARACTERISTICS OF AUTOSTEREOSCOPIC 3D IMAGE DISPLAY

CROSS-REFERENCE TO RELATED APPLICATION

This application claims priority to and the benefit of Korean Patent Application No. 2014-0176200, filed on Dec. 9, 2014, the disclosure of which is incorporated herein by reference in its entirety.

BACKGROUND

1. Field of the Invention

The present invention relates to a system and method for measuring viewing zone characteristics of an autostereoscopic three-dimensional (3D) image display device, and more particularly, to a system and method for measuring viewing zone characteristics of an autostereoscopic 3D image display device which may efficiently determine a precise optimum viewing distance (OVD) by analyzing ray tracing results from at least one viewpoint image of some local areas of the autostereoscopic 3D image display device, and determine a position error range of viewpoint images formed from mutually different areas of the 3D image display device.

2. Discussion of Related Art

The optical property of a multi-view three-dimensional (3D) image display device using a parallax barrier is generally slightly different from designed values. The representative values among the designed values of the multi-view 3D image display device are an optimum viewing distance (OVD) and a viewpoint distance (VPD) in OVD.

In order to estimate an image quality of the multi-view 3D image display device, the OVD is usually measured and the optical characteristics such as crosstalk and luminance uniformity are evaluated in the measured OVD. Various evaluation methods of the multi-view 3D image display device have been presented. However, a decision method of position error of viewpoint images formed from the entire 3D display area and a precise measurement method of OVD are not presented until now.

FIG. 1 is a conceptual diagram illustrating a 3D image display device using a conventional parallax barrier.

Referring to FIG. 1, the 3D image display device using the parallax barrier according to the prior art roughly includes a display unit 10, a parallax barrier 20 disposed on a front side of the display unit 10 to be spaced apart from the display unit 10 by a predetermined distance, and the like. Here, the display unit 10 may use a general liquid crystal display (LCD) panel.

The parallax barrier 20 is formed in such a manner that a slit type aperture through which light emitted from the display unit 10 is transmitted and a barrier for blocking light are repeatedly arranged. The slant parallax barrier 20 is used to maintain uniform color characteristics at each viewing zone and allocate the reduced resolution to longitudinal and transverse directions of the display unit 10. In this instance, the slanted angle of the parallax barrier 20 may be, for example, $\tan^{-1}(1/3)=18.435$ degrees.

Meanwhile, the relationships between variables of n-view 3D display with the parallax barrier 20 may be represented as Relation Equations shown on a lower side of FIG. 1. Here, $W_P$ is a unit pixel size or unit subpixel size, $W_{PB\_S}$ and $T_{PB}$ are respectively a size and period of the slit type aperture of the parallax barrier 20, d is a distance between the display unit 10 and the parallax barrier 20, and $D_{VP}$ is a viewpoint distance at OVD. Almost all methods to measure the optical characteristics of multi-view 3D display use angular properties of viewpoint images from a local spot of the display unit 10.

However, these measurement methods are practically different from an observer's situation seeing 3D images, because luminance of viewpoint images formed from the entire 3D display area affects the observer and a condition (for example, a gap) between the display panel and the parallax barrier at the entire 3D display area is not generally uniform.

PRIOR ART DOCUMENTS

Non-Patent Documents

[Non-Patent Document 0001] Salmimaa, M. and Jarvenpaa, T., "Objective Evaluation of Multi-View Autostereoscopic 3D display", SID Symposium Digest, Vol. 39, 267-270 (2008)

[Non-Patent Document 0002] Lee, J., Lee, J. S., Kim, S. L., Han, J. S., Jun, T. J. and Shin, S. T., "Optical Performance Analysis Method of Autostereoscopic 3D displays", SID Symposium Digest, Vol. 41, 327-330 (2010)

[Non-Patent Document 0003] Boev, A., Gotchev, A. and Egiazarian, K., "Crosstalk Measurement Methodology For Auto-Stereoscopic Screens", 3DTV Conference, 1-4 (2007)

[Non-Patent Document 0004] Jarvenpaa, T. and Salmimaa, M., "Optical Characterization Methods for Autostereoscopic 3D Displays". Proc. Of Euro Display 132-135 (2007)

[Non-Patent Document 0005] Wu, C.-L., Huang, K.-C., Liao, C.-C., Chen, Y.-H., Lee, K., "Autostereoscopic display optical properties evaluation", Proc. SPIE 7524, 75241L (2010)

SUMMARY OF THE INVENTION

The present invention is directed to a system and method for measuring viewing zone characteristics of an autostereoscopic three-dimensional (3D) image display device, which may efficiently determine a precise optimum viewing distance (OVD) by analyzing ray tracing results from at least one viewpoint image of some local areas of the autostereoscopic 3D display, and determine a position error range of viewpoint images formed from mutually different areas of the 3D display.

According to an aspect of the present invention, there is provided a system for measuring viewing zone characteristics of an autostereoscopic three-dimensional (3D) image display device, including: at least one image sensor that is provided on a front side of the image display device, and measures characteristics of luminance distribution of viewpoint images in a depth direction (Z-direction) formed from at least two local areas which are designated in advance in a horizontal direction (X-direction) of the image display device; and a determination unit that determines, as an optimum viewing distance (OVD), a position of the image sensor corresponding to a depth direction (Z-direction) having a horizontal direction (X-direction) minimum deviation of a center position of luminance distribution of light generated from the same viewpoint image of each of the at least two local areas by analyzing the characteristics of luminance distribution on an X-Z plane measured from the image sensor.

Here, the at least one image sensor may be a movable sensor, and measure the characteristics of luminance distribution in an active area of the sensor while moving in a stepwise manner in the horizontal direction (X-direction) or the depth direction (Z-direction).

Also, a height of the image sensor may be arranged at a center position of the image display device.

Also, the at least two local areas may be constituted of a first local area having a predetermined width and height which is designated in a center position of the image display device, and second and third local areas having the same width and height as those of the first local area which are designated to be spaced apart from both sides of the first local area by the same distance.

Also, the determination unit may determine a viewpoint distance (VPD) of the OVD using a least square fitting method in the determined OVD.

According to another aspect of the present invention, there is provided a method for measuring viewing zone characteristics of an autostereoscopic 3D image display device using at least one image sensor provided on a front side of the image display device, including: (a) measuring, by the at least one image sensor, characteristics of luminance distribution of viewpoint images in a depth direction (Z-direction) formed from at least two local areas which are designated in advance in a horizontal direction (X-direction) of the image display device; and (b) determining, as an OVD, a position of the image sensor corresponding to a depth direction (Z-direction) having a horizontal direction (X-direction) minimum deviation of a center position of luminance distribution of light generated from the same viewpoint image of each of the at least two local areas by analyzing the characteristics of luminance distribution measured in the (a) measuring.

Here, in the (a) measuring, the at least one image sensor may be a movable sensor, and measure the characteristics of luminance distribution in an active area of the sensor while moving in a stepwise manner in the horizontal direction (X-direction) or the depth direction (Z-direction).

Also, a height of the image sensor may be arranged at a center position of the image display device.

Also, the at least two local areas may be constituted of a first local area having a predetermined width and height which is designated in a center position of the image display device, and second and third local areas having the same width and height as those of the first local area which are designated to be spaced apart from both sides of the first local area by the same distance.

Also, the method for measuring viewing zone characteristics may further include, after the (b) determining, determining a VPD of the OVD using a least square fitting method in the OVD determined in the (b) determining.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
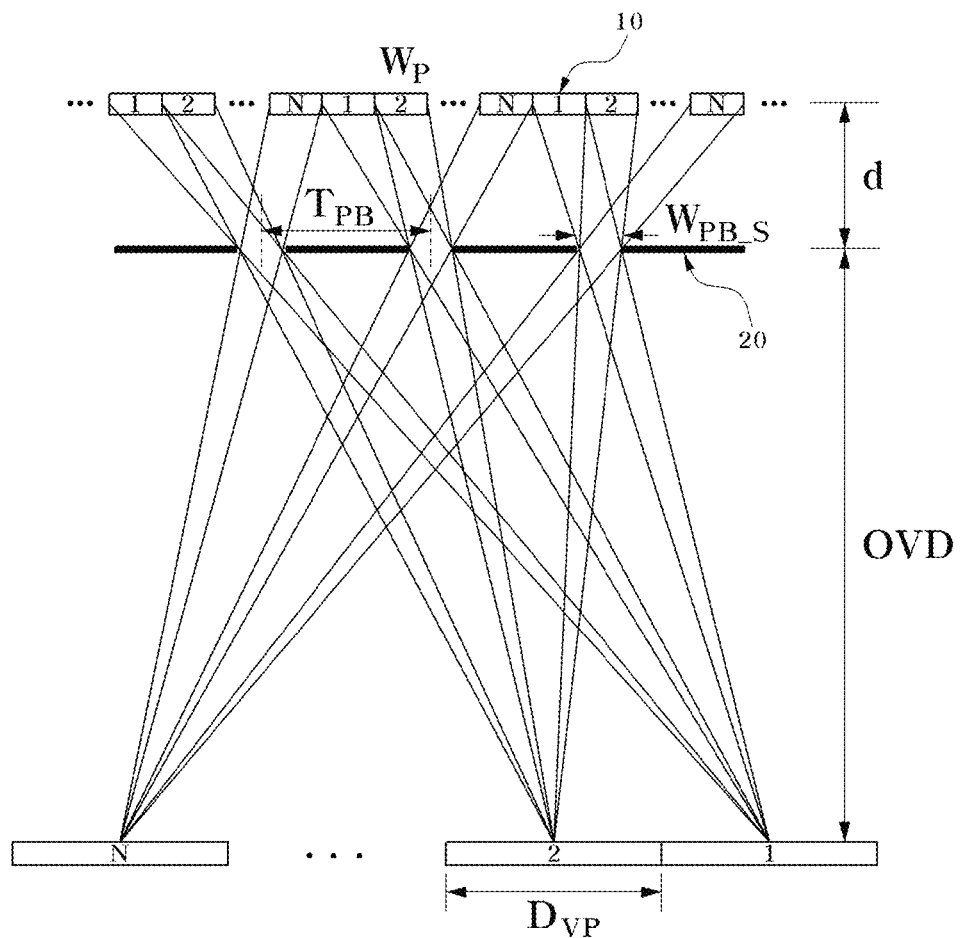
FIG. 1 is a conceptual diagram illustrating a three-dimensional (3D) image display device using a conventional parallax barrier.
Figure 2:
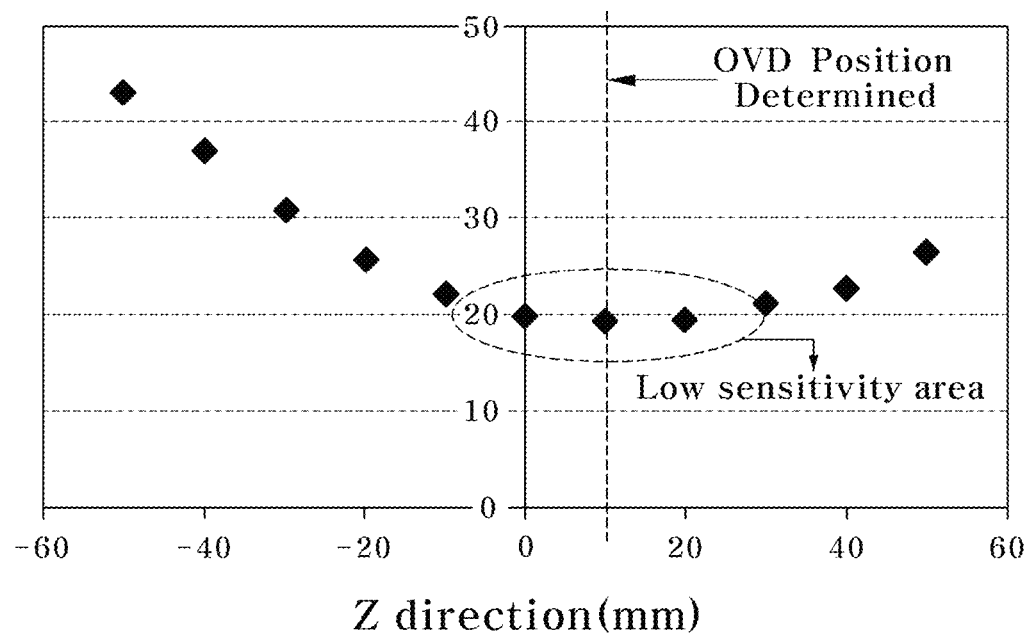
FIG. 2 is a graph illustrating a full width at half maximum (FWHM) of luminance distribution of viewpoint images depending on a distance from a display unit.

FIG. 2 is a graph illustrating a full width at half maximum (FWHM) of luminance distribution of viewpoint images depending on a distance based on an optimum viewing distance (OVD) estimated from a display unit of FIG. 1.

An OVD determining method using viewpoint images formed from the entire display area determines, as an OVD, a distance from the multi-view three-dimensional (3D) display unit 10 having a minimum value at the FWHM of luminance distribution of viewpoint images.

The determined OVD may be fixed from observation about the luminance distribution of viewpoint images of an X-Y plane. The FWHM of the luminance distribution of viewpoint images has a deviation in a Z-direction from the minimum value. The minimum Z-direction position of the FWHM is determined as the OVD. As an example, in a case of FIG. 2, a practically measured OVD is determined to be larger by about 10 mm than a supposed OVD.

However, a rate of change of the FWHM in the vicinity of the minimum value (low sensitivity area) is low even in an ideal simulation situation. Also, a position error range of viewpoint images in the determined OVD cannot be calculated.

Figure 3:
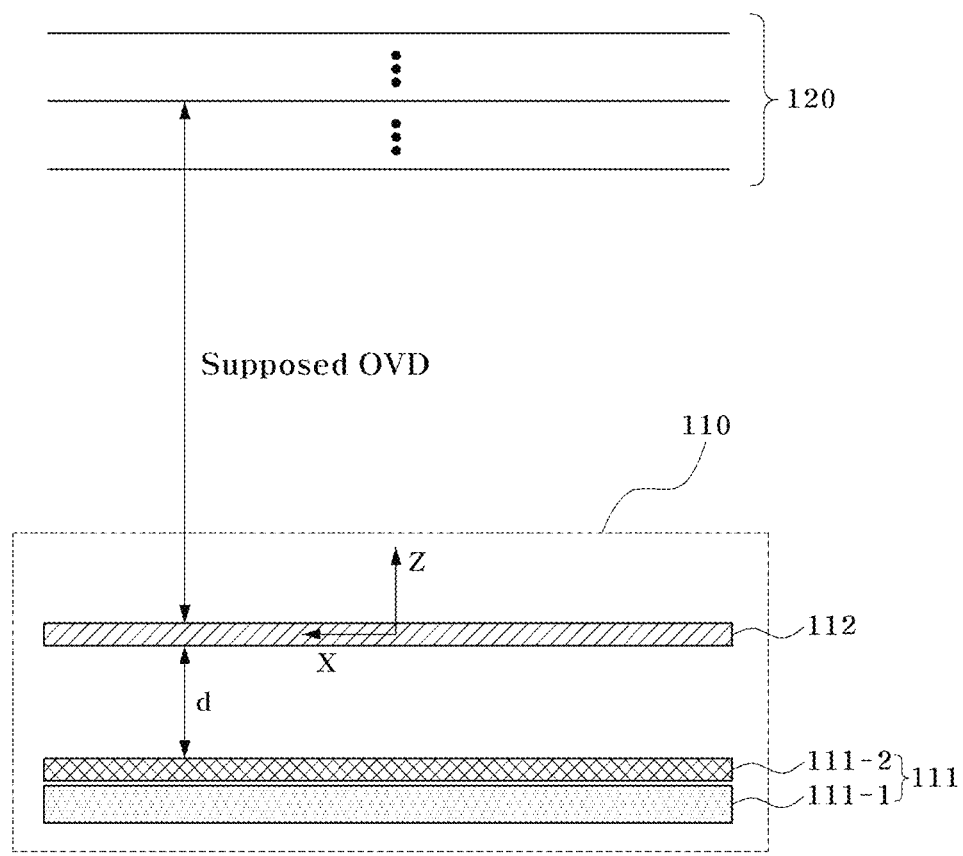
FIG. 3 is a conceptual diagram illustrating a system for measuring viewing zone characteristics of an autostereoscopic 3D image display device according to an embodiment of the present invention.
Figure 4:
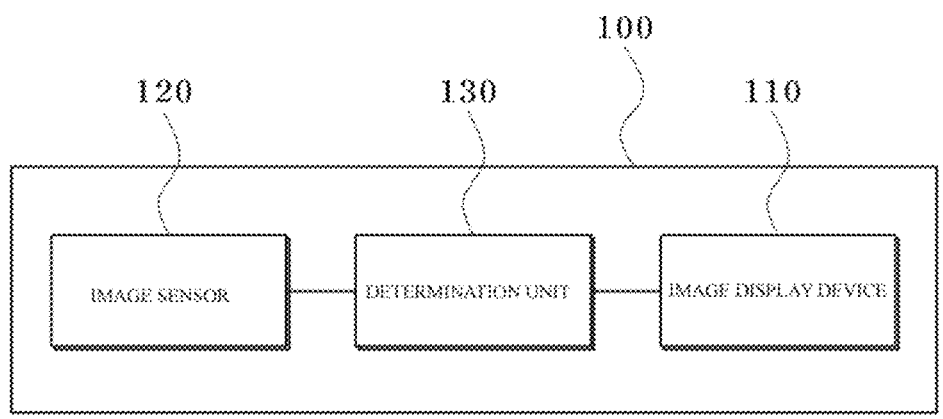
FIG. 4 is a block diagram illustrating a system for measuring viewing zone characteristics of an autostereoscopic 3D image display device according to an embodiment of the present invention.

FIG. 3 is a conceptual diagram illustrating a system for measuring viewing zone characteristics of an autostereoscopic 3D image display device according to an embodiment of the present invention, and FIG. 4 is a block diagram illustrating a system for measuring viewing zone characteristics of an autostereoscopic 3D image display device according to an embodiment of the present invention.

Referring to FIGS. 3 and 4, the system 100 for measuring viewing zone characteristics of an autostereoscopic 3D image display device according to an embodiment of the present invention may roughly include an image display device 110, at least one image sensor 120, and a determination unit 130.

Here, in order to display 3D images, the image display device 110 may use a parallax barrier or a lenticular lens which is a parallax separation means, or a linear light source. In the parallax barrier or the lenticular lens which is the parallax separation means, images of left and right eyes may be separated to be alternately formed so that an observer can observe 3D images from a predetermined observation distance.

Specifically, in the parallax barrier, barriers and apertures are alternately formed. As the lenticular lens, a lenticular lens in which a cylindrical lens is periodically formed may be used. However, the parallax separation means is not limited thereto, and obviously, various means for achieving the object of the present invention such as an optical plate in which micro prisms are periodically arranged may be used. The linear light source may include various kinds of linear light sources such as a linear light source constituted of a point light source for displaying 3D images.

FIG. 3 is a conceptual diagram illustrating several optical distribution measurement surfaces disposed in the supposed OVD which are separated from the multi-view 3D display device 110 having the parallax barrier by a predetermined distance. Referring to FIG. 3, the image display device includes a display unit 111 constituted of a light source 111-1 and a panel member 111-2, a parallax barrier 112, and the like.

On the panel member 111-2 of the display unit 111, unit pixel array zones distinguished by a designed number of viewpoint images are formed. As display conditions of the simulation used to verify a method of determining the OVD of the multi-view 3D display, the transmittance of operating pixels in which viewpoint images are turned on is 100% and the transmittance of non-operating pixels is 0%. The light source 111-1 used in the simulation has been assumed as a Lambertian surface, and this assumption corresponds to an ideal case. Practically, the transmittance of operating pixels is less than 100% and the transmittance of non-operating pixels is more than 0%, and the light source is not an ideal Lambertian surface. However, by determining that a horizontal deviation between the same viewpoint images depending on the depth direction (Z-direction) of viewpoint images that occur in a local area of the multi-view 3D display is minimized, there is no problem that the concept of the present invention is applied to even the practical case.

Such a display unit 111 is a module including an image display means that can display input image signals, such as a liquid crystal display (LCD), a light emitting diode (LED), an organic light emitting diode (OLED), a plasma display panel (PDP), or the like, and displays two dimensional images with respect to the input image signals.

In addition, in a case of two viewpoint design, left eye pixels for displaying left eye image information and right eye pixels for displaying right eye image information may be alternately formed in the display unit 111.

In the parallax barrier 112, vertical barriers are provided at predetermined intervals to intercept light emitted from the right eye pixels and the left eye pixels, and a slit type aperture between the barriers makes light emitted from the right eye pixels and the left eye pixels pass, so that virtual 3D images may be implemented to an observer.

In FIG. 3, the image sensor 120 may measure characteristics of luminance distribution of viewpoint images in the depth direction (Z-direction) formed from at least two local areas which are designated in advance in the horizontal direction (X-direction).

The at least one image sensor 120 is provided on a front side of the image display device 110. For example, as shown in FIG. 3, the at least one image sensor 120 may be provided to be spaced apart from each other by a predetermined distance in the horizontal direction (X-direction) or depth direction (Z-direction). Preferably, the OVD may be disposed at intervals of about 10 mm in the depth direction (Z-direction) in a range of the OVD of ±50 mm.

Alternatively, the at least one image sensor 120 may be a movable sensor. That is, the at least one image sensor 120 may measure the characteristics of luminance distribution in an active area of the sensor while moving in a stepwise manner in the horizontal direction (X-direction) or the depth direction (Z-direction). In this manner, when the at least one image sensor 120 is implemented as the movable sensor, a plurality of sensors are not required.

It is preferable that the height (Y-direction) of the image sensor 120 be disposed in a center position of the image display device 110.

The determination unit 130 determines, as an OVD, a position of the image sensor corresponding to a depth direction (Z-direction) having a horizontal direction (X-direction) minimum deviation of a center position of luminance distribution of light generated from the same viewpoint image of each local area by analyzing the characteristics of luminance distribution on an X-Z plane measured from the image sensor 120.

In addition, the determination unit 130 may determine a viewpoint distance (VPD) of the OVD using a least square fitting method in the determined OVD.

Using the system for measuring viewing zone characteristics of the autostereoscopic 3D image display device according to the present invention, a method for effectively determining an effective OVD different from an ideally designed OVD will be described.

Figure 5A:
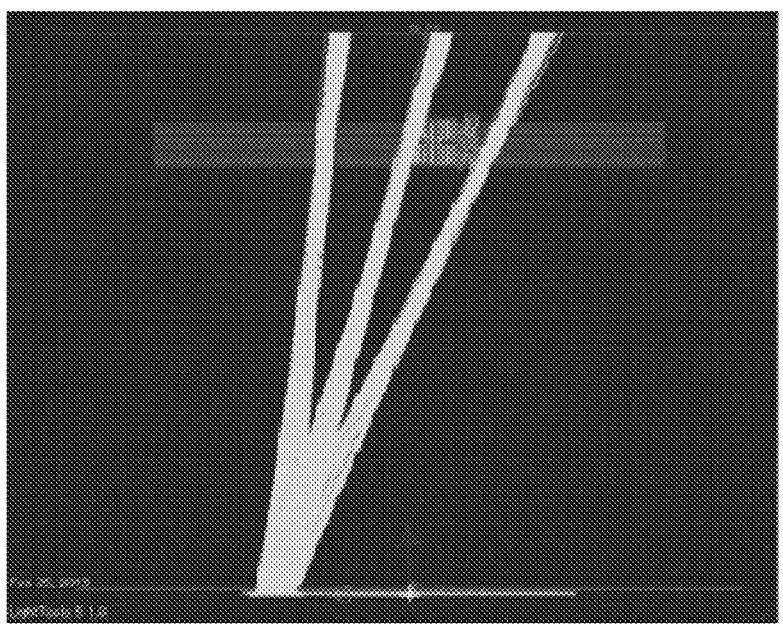
FIG. 5A is a diagram illustrating ray tracing results of viewpoint images formed from three local areas of an image display device according to an embodiment of the present invention, and illustrates ray tracing results of one viewpoint among the viewpoint images formed from the three local areas set in advance in the image display device 110 on an X-Z plane.
Figure 5B:
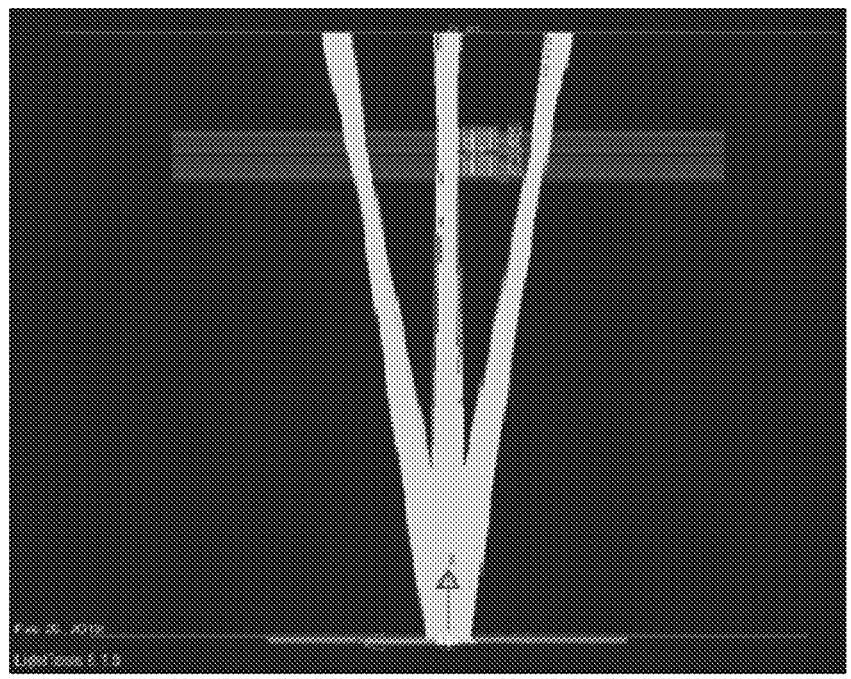
FIG. 5B is a diagram illustrating ray tracing results of viewpoint images formed from three local areas of an image display device according to an embodiment of the present invention, and illustrates ray tracing results of another viewpoint among the viewpoint images formed from the three local areas set in advance in the image display device 110 on an X-Z plane.
Figure 5C:
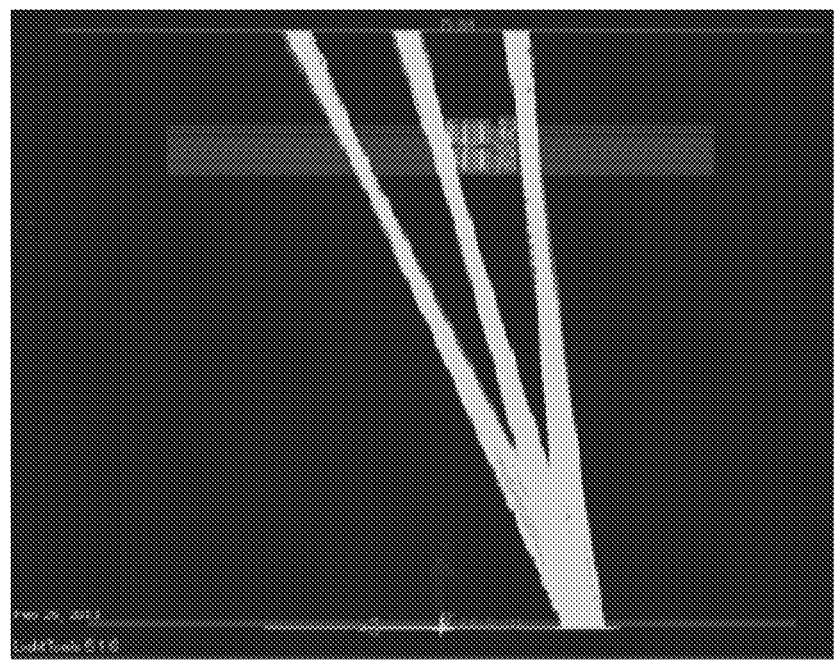
FIG. 5C is a diagram illustrating ray tracing results of viewpoint images formed from three local areas of an image display device according to an embodiment of the present invention, and illustrates ray tracing results of still another viewpoint among the viewpoint images formed from the three local areas set in advance in the image display device 110 on an X-Z plane.

FIG. 5 is a diagram illustrating ray tracing results of viewpoint images formed from three local areas of an image display device according to an embodiment of the present invention, and illustrates ray tracing results of one viewpoint among the viewpoint images formed from the three local areas set in advance in the image display device 110 on an X-Z plane. That is, rays formed at the center of an observation position of each local area indicate a viewing zone formed by the viewpoint image included in a main viewing zone, and rays formed in upper and lower portions of the observation position indicate a side viewing zone formed by the same viewpoint image.

In an example of FIG. 5, a width of the image display device 110 is 640 mm, a width of each local area is 80 mm, a supposed OVD is 970 mm, the number of designs of viewpoint images is 10, and a VPD of the OVD is 16.25 mm.

Figure 6A:
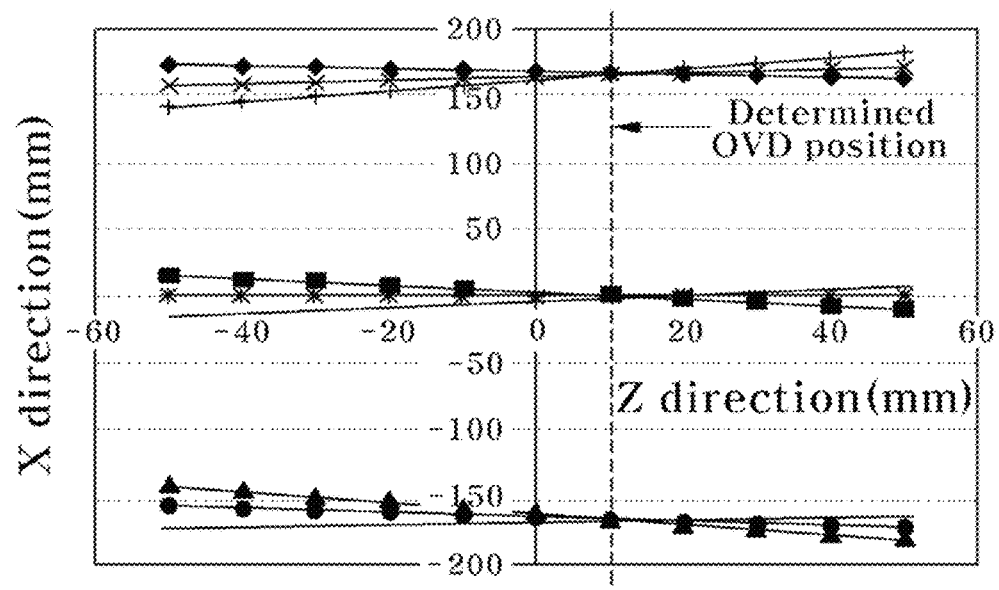
FIG. 6A is a graph illustrating ray tracing results analyzed so as to determine an optimum viewing distance (OVD) according to an embodiment of the present invention.
Figure 6B:
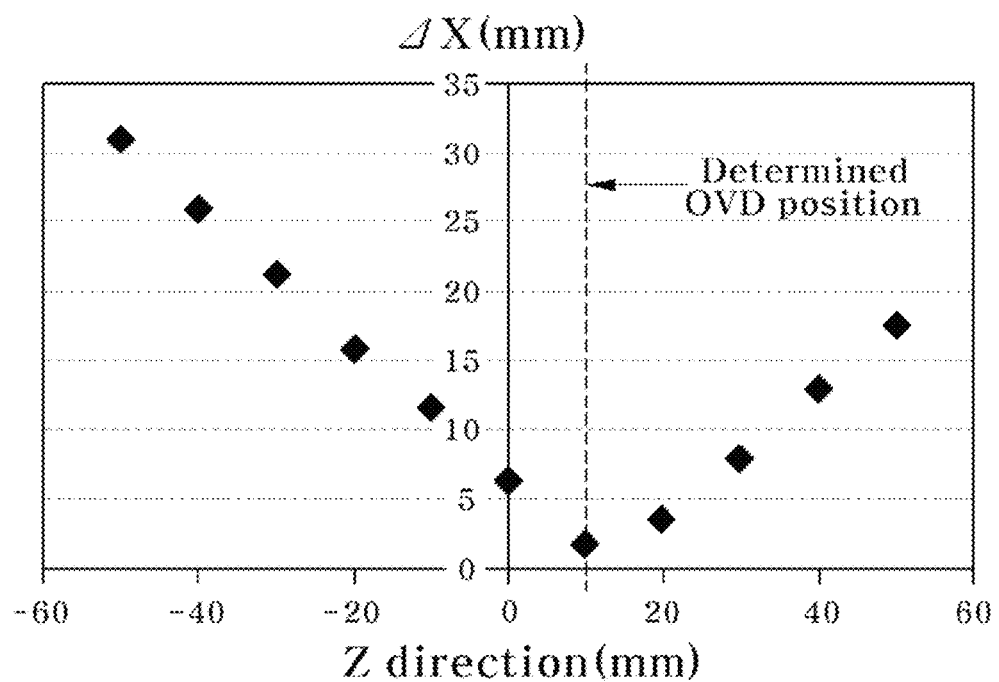
FIG. 6B is a graph illustrating a position error of x-direction of the same viewpoint images formed from different local areas of the image display device according to an embodiment of the present invention.

FIG. 6 is a graph illustrating ray tracing results analyzed so as to determine an OVD according to an embodiment of the present invention.

Referring to FIG. 6, by analyzing ray tracing results formed from one viewpoint image of some local areas designated in the image display device 110, the OVD may be determined. In FIG. 6, there are three groups of viewpoint images. The ray group of positive x-direction is a right side viewing zone of the viewpoint images, the ray group of centered x-direction is a main viewing zone of the viewpoint images, and the ray group of negative x-direction is a left side viewing zone of the viewpoint images.

Each data point is calculated from the center position of luminance distribution of the viewpoint images in the z-direction formed from each local area of the image display device 110. As shown in (a) of FIG. 6, the z-direction position where the rays of the viewpoint images formed from three local areas of the image display device 110 coincide with each other is determined as the OVD.

A position error of x-direction of the same viewpoint images formed from different local areas of the image display device 110 is also minimized at the OVD as shown in (b) of FIG. 6.

The determined OVD of the autostereoscopic multi-view 3D image display device 110 according to the present invention is somewhat different from an ideal simulation situation. However, even if the parallax barrier 112 is not flat but has some convex deformation at the time of practical manufacturing or a medium effect is added between the parallax barrier and the display, the present invention can be effective for determining the OVD and the position error of viewpoint images in the OVD. In this practical case, the determined OVD may be named an effective OVD in order to distinguish it from an ideal OVD as shown in (a) of FIG. 6.

Figure 7:
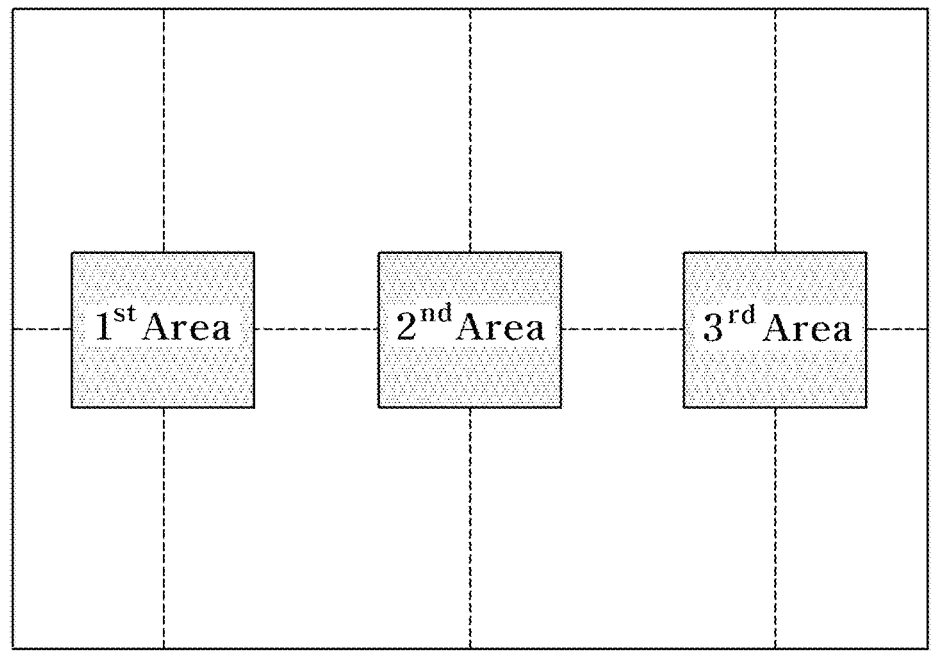
FIG. 7 is a diagram illustrating three local areas in an image display device used to determine an OVD according to an embodiment of the present invention.

FIG. 7 is a diagram illustrating three local areas in an image display device used to determine an OVD according to an embodiment of the present invention, and illustrates three local areas in the image display device that is used in measuring luminance distribution of viewpoint images.

Referring to FIG. 7, three local areas are set on the panel member 111-2 of the image display device 110 according to an embodiment of the present invention, and are constituted of a first local area ($2^{nd}$ area) having a predetermined width and height which is designated in a center position of the panel member 111-2 of the image display device 110 and second and third local areas ($1^{st}$ area and $3^{rd}$ area) having the same width and height as those of the first local area ($2^{nd}$ area) which are designated to be spaced apart from both sides of the first local area by the same distance.

The width of each of the first to third local areas may be 71.7 mm (400 pixels), and the height thereof may be 53.775 mm (300 pixels). The first local area ($2^{nd}$ area) is positioned at the center of the panel member 111-2, and each local area is at the same distance, that is, 114.72 mm, away in the horizontal direction.

Meanwhile, to verify the measurement method for determining the OVD, a 10-view slanted parallax barrier (the slanted angle of the parallax barrier is arcTan(⅓)) is designed and combined with a 15.6 inch LCD panel. Main parameters are shown in Table 1.

TABLE 1

| Characteristics | Specification |
| --- | --- |
| Panel size | 15.6 inch (diagonal) |
| Resolution | 1920 × 1080 |
| Sub-pixel size | (W) 0.05975 mm |
|  | (H) 0.17925 mm |
| The number of viewpoint images | 10 |
| Viewpoint distance (VPD) | 16.25 mm |
| OVD | 600 mm |

Figure 8A:
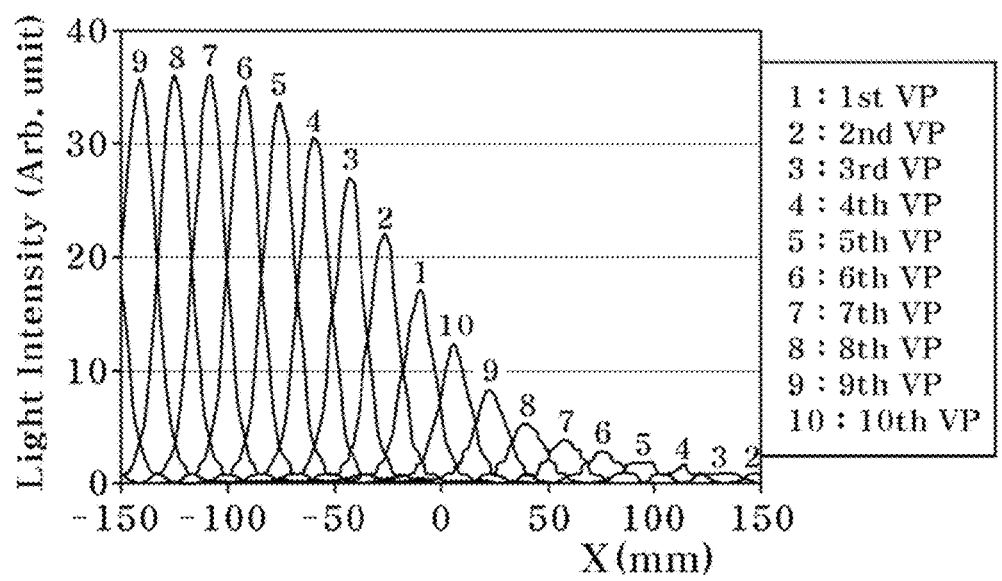
FIG. 8A is a graph illustrating luminance distribution of viewpoint images measured from one of three local areas according to an embodiment of the present invention.
Figure 8B:
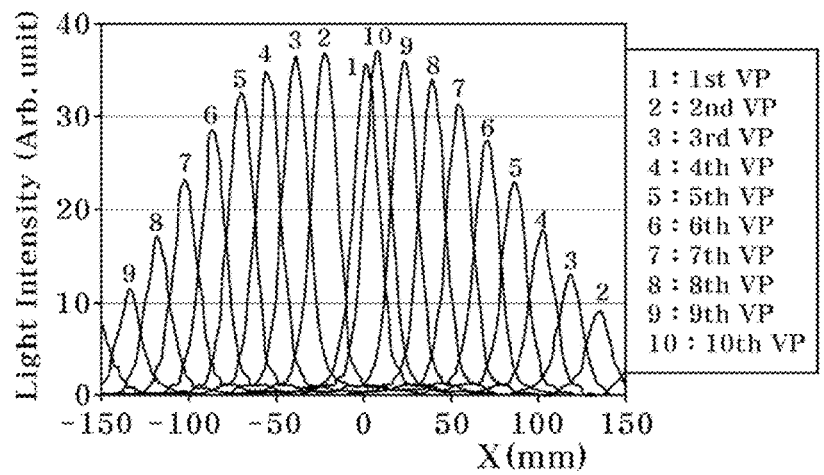
FIG. 8B is a graph illustrating luminance distribution of viewpoint images measured from another of three local areas according to an embodiment of the present invention.
Figure 8C:
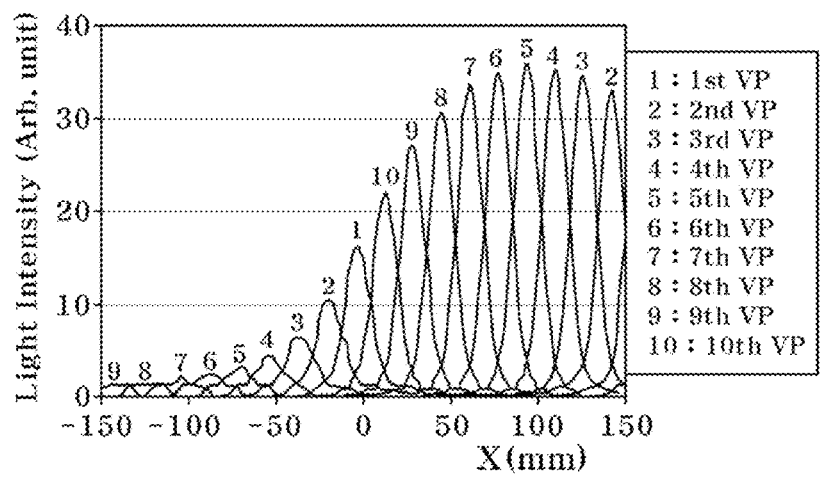
FIG. 8C is a graph illustrating luminance distribution of viewpoint images measured from still another of three local areas according to an embodiment of the present invention.

FIG. 8 is a graph illustrating luminance distribution of viewpoint images measured from three local areas according to an embodiment of the present invention, and illustrates luminance distribution of viewpoint images formed from each local area at Z=570 mm.

Referring to FIG. 8, using the image sensor 120 such as a charge-couple device (CCD), the characteristics of the luminance distribution of viewpoint images depending on the x-direction at the same distance from the image display device(panel?) 110 may be measured.

This measurement method according to the present invention is different from usual goniometric methods which measure angular dependency of the viewing zone. Since this measurement method according to the present invention uses almost horizontal resolution of the image sensor 120, it is possible to accurately measure the optical properties of the multi-view 3D image display device.

Figure 9:
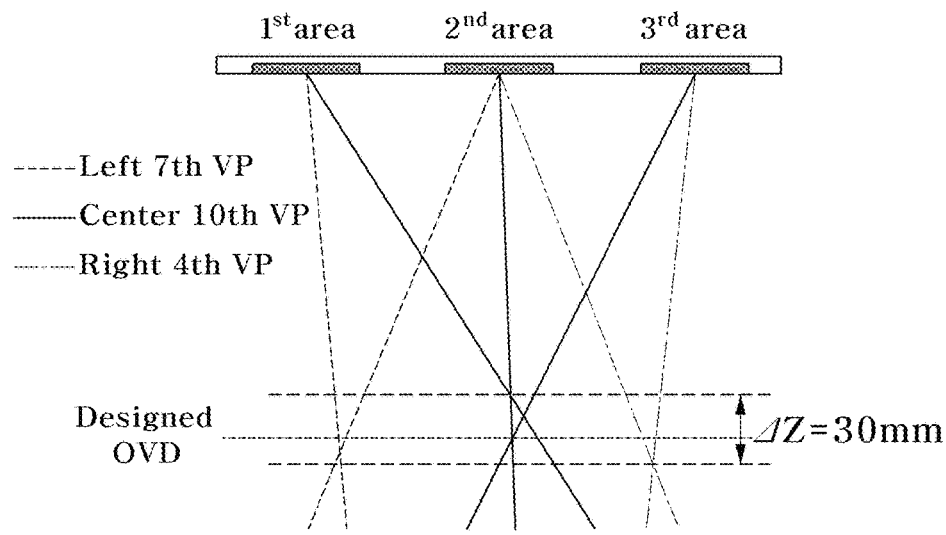
FIG. 9 is a conceptual diagram illustrating measured ray tracing results of some viewpoint images according to an embodiment of the present invention.

FIG. 9 is a conceptual diagram illustrating measured ray tracing results of some viewpoint images according to an embodiment of the present invention.

Referring to FIG. 9, the height of the image sensor 120 is arranged at the center position of the panel member 111-2 provided in the image display device 110. The measurement range of z-direction is from 520 mm to 620 mm at 10 mm intervals. The range of x-direction is from −150 mm to 150 mm.

Using the measurement results, conditions of the multi-view 3D image display device may be verified. Ideally, all viewpoint images formed from different local areas have to coincide at a designed OVD. But, measured results are different. For example, representative viewpoint images coincide at different z-direction positions from the designed OVD as shown in FIG. 9.

Figure 10:
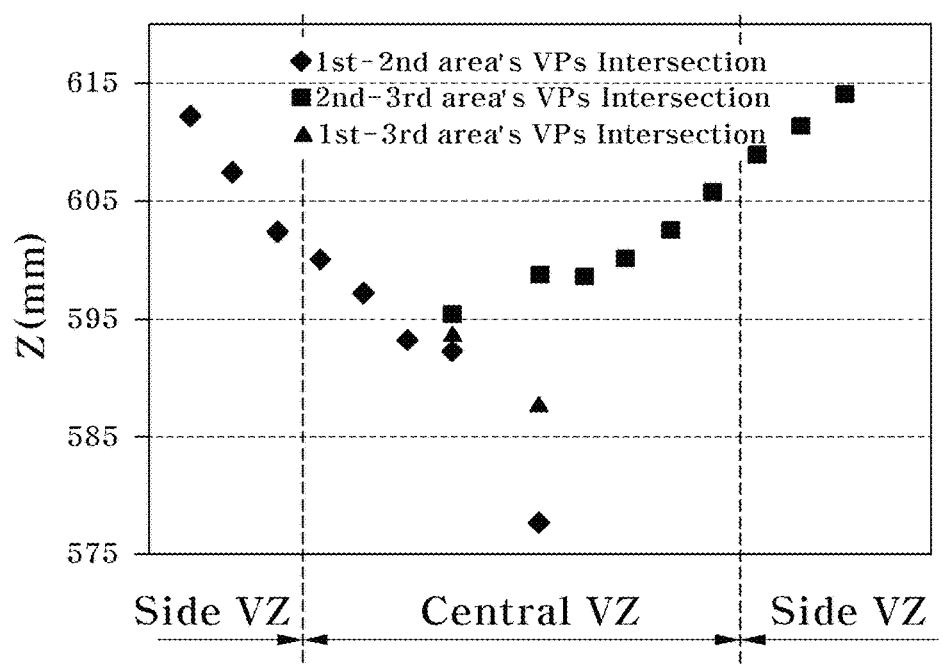
FIG. 10 is a graph illustrating a z-direction position of an intersection of viewpoint images formed from different local areas according to an embodiment of the present invention.

FIG. 10 is a graph illustrating a z-direction position of an intersection of viewpoint images formed from different local areas according to an embodiment of the present invention.

Referring to FIG. 10, z-direction positions of intersection of viewpoint images formed from different local areas are different depending on an x-direction position. The z-direction positions of intersection of viewpoint images at the central viewing zone (VZ) are lower than the z-direction positions of intersection of viewpoint images at the side VZ unlike the ideal simulation situation.

As a result, the OVD position is different depending on the x-direction position. We consider that this difference between the simulation and the real situation is caused by a medium effect with a refractive index and non-uniformed gap effect between the parallax barrier 112 and the display unit 111.

Figure 11:
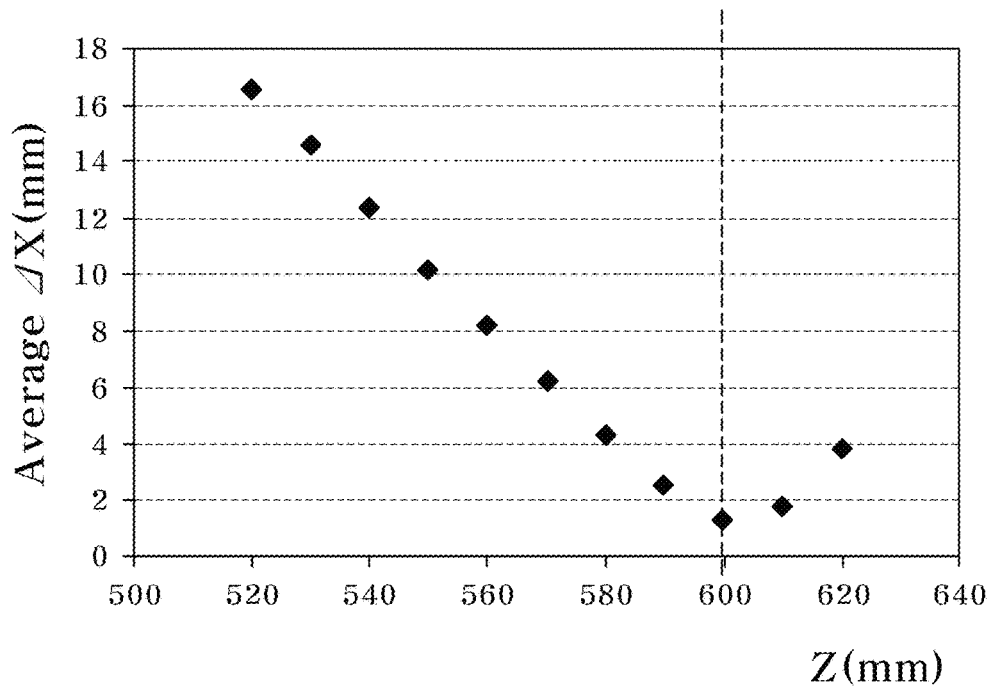
FIG. 11 is a graph illustrating an averaged x-direction deviation of a center position of each viewpoint image according to an embodiment of the present invention.

FIG. 11 is a graph illustrating an averaged x-direction deviation of a center position of each viewpoint image according to an embodiment of the present invention.

Referring to FIG. 11, the OVD determined by intersection of viewpoint images formed from different local areas is within the range from 575 mm to 615 mm. In this case, we can also determine the OVD as the effective OVD of practical multi-view 3D image display device as described above. The OVD determined like this is an averaged value of several viewpoint images.

Figure 12:
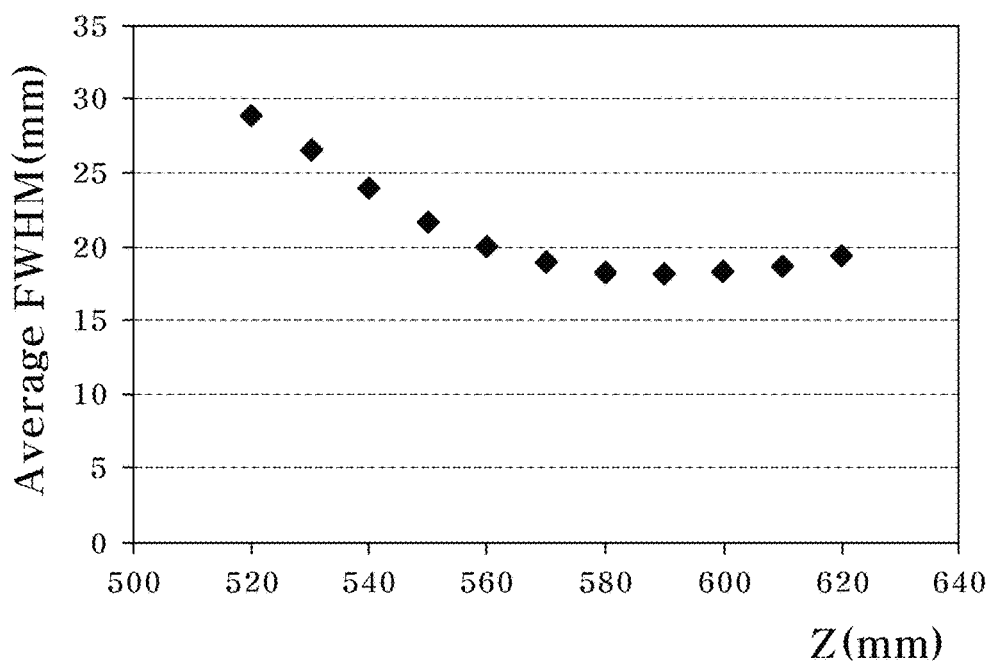
FIG. 12 is a graph illustrating an FWHM of luminance distribution of viewpoint images depending on a z-direction position according to an embodiment of the present invention.

FIG. 12 is a graph illustrating an FWHM of luminance distribution of viewpoint images depending on a z-direction position according to an embodiment of the present invention.

Referring to 12, the averaged x-direction deviation of the center position of each viewpoint image is essentially changed depending on a z-direction position. It is minimized at Z=600 mm and this z-direction position is the effective OVD of the multi-view 3D display. In this case, the minimum average ΔX is 1.33 mm.

On the other hand, the FWHM of luminance distribution of viewpoint images formed from the entire 3D display area is not sensitively changed near z=600 mm depending on the z-direction position as shown in FIG. 12.

The average FWHM is an average value for viewpoint images at each z-direction position. In this case, the difference of FWHM is only 0.76 mm depending on the z-direction position within the range from 570 mm to 610 mm. Therefore, an approximate OVD may be determined using the FWHM of luminance distribution of viewpoint images, but a method using the z-direction position in which a horizontal error of the same viewpoint image that occurs in locally different areas is minimized may more effectively decide the OVD of the multi-view 3D display on measurement.

Figure 13:
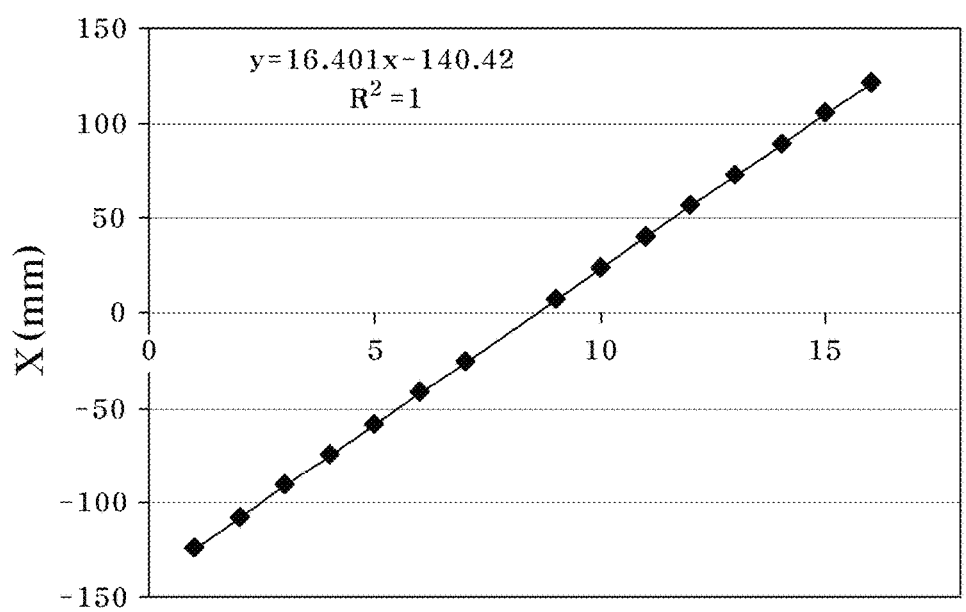
FIG. 13 is a graph illustrating a viewpoint distance in an OVD determined using a least square fitting method according to an embodiment of the present invention.

FIG. 13 is a graph illustrating a viewpoint distance in an OVD determined using a least square fitting method according to an embodiment of the present invention, and in FIG. 13, x-direction positions of viewpoint images are measured.

Referring to FIG. 13, the effective VPD at the determined effective OVD may be determined. The effective VPD calculated using the least square fitting method is 16.4 mm. This value is only 0.93% difference compared with the designed VPD of 16.25 mm.

The present invention is useful to determine the effective OVD and VPD of the multi-view 3D image display device. In addition, it is possible to define the position error of viewpoint images in the determined OVD. This measurement method according to the present invention may be applied to verify a specification of the multi-view 3D image display device and especially to calibrate a multi-view 3D system with a viewer's position tracking function.

As described above, according to the system and method for measuring viewing zone characteristics of the autostereoscopic 3D image display device according to the embodiments of the present invention, it is possible to efficiently determine a precise OVD by analyzing ray tracing results from at least one viewpoint image of some local areas of the autostereoscopic 3D image display device, and determine a position error range of viewpoint images formed from mutually different areas of the 3D image display device. Thus, it is possible to realize more objective evaluation with respect to the optical characteristics of the 3D image display device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for measuring viewing zone characteristics of an autostereoscopic three-dimensional (3D) image display device, comprising:
   at least one image sensor that is provided on a front side of the image display device, and measures characteristics of luminance distribution of viewpoint images in a depth direction (Z-direction) formed from at least two local areas which are designated in advance in a horizontal direction (X-direction) of the image display device; and
   a determination unit that determines, as an optimum viewing distance (OVD), a position of the image sensor corresponding to a depth direction (Z-direction) having a horizontal direction (X-direction) minimum deviation of a center position of luminance distribution of light generated from the same viewpoint image of each of the at least two local areas by analyzing the characteristics of luminance distribution on an X-Z plane measured from the image sensor, wherein the autostereoscopic 3D image display has pixels which provides view point images and each of the at least two local areas comprises at least 10 pixels for each view image.

2. The system for measuring viewing zone characteristics of claim 1, wherein the at least one image sensor is a movable sensor, and measures the characteristics of luminance distribution in an active area of the sensor while moving in a stepwise manner in the horizontal direction (X-direction) or the depth direction (Z-direction).

3. The system for measuring viewing zone characteristics of claim 1, wherein a height of the image sensor is arranged at a center position of the image display device.

4. The system for measuring viewing zone characteristics of claim 1, wherein the at least two local areas are constituted of a first local area having a predetermined width and height which is designated in a center position of the image display device, and second and third local areas having the same width and height as those of the first local area which are designated to be spaced apart from both sides of the first local area by the same distance.

5. The system for measuring viewing zone characteristics of claim 1, wherein the determination unit determines a viewpoint distance (VPD) of the OVD using a least square fitting method in the determined OVD.

6. A method for measuring viewing zone characteristics of an autostereoscopic 3D image display device using at least one image sensor provided on a front side of the image display device, comprising:
   (a) measuring, by the at least one image sensor, characteristics of luminance distribution of viewpoint images in a depth direction (Z-direction) formed from at least two local areas which are designated in advance in a horizontal direction (X-direction) of the image display device; and (b) determining, as an OVD, a position of the image sensor corresponding to a depth direction (Z-direction) having a horizontal direction (X-direction) minimum deviation of a center position of luminance distribution of light generated from the same viewpoint image of each of the at least two local areas by analyzing the characteristics of luminance distribution measured in the (a) measuring, wherein the autostereoscopic 3D image display has pixels which provides view point images and each of the at least two local areas comprises at least 10 pixels for each view image.

7. The method for measuring viewing zone characteristics of claim 6, wherein, in the (a) measuring, the at least one image sensor is a movable sensor and measures the characteristics of luminance distribution in an active area of the sensor while moving in a stepwise manner in the horizontal direction (X-direction) or the depth direction (Z-direction).

8. The method for measuring viewing zone characteristics of claim 6, wherein a height of the image sensor is arranged at a center position of the image display device.

9. The method for measuring viewing zone characteristics of claim 6, wherein the at least two local areas are constituted of a first local area having a predetermined width and height which is designated in a center position of the image display device, and second and third local areas having the same width and height as those of the first local area which are designated to be spaced apart from both sides of the first local area by the same distance.

10. The method for measuring viewing zone characteristics of claim 7, further comprising, after the (b) determining:
  determining a VPD of the OVD using a least square fitting method in the OVD determined in the (b) determining.

* * * * *